United States Patent [19]

Nagai

[11] Patent Number: 4,825,399
[45] Date of Patent: Apr. 25, 1989

[54] APPARATUS FOR FOURIER TRANSFORM

[75] Inventor: Hideo Nagai, Tachikawa, Japan

[73] Assignee: Yokogawa Medical Systems, Limited, Tokyo, Japan

[21] Appl. No.: 933,635

[22] PCT Filed: Feb. 26, 1986

[86] PCT No.: PCT/JP86/00093
§ 371 Date: Oct. 15, 1986
§ 102(e) Date: Oct. 15, 1986

[87] PCT Pub. No.: WO86/05295
PCT Pub. Date: Sep. 12, 1986

[30] Foreign Application Priority Data

Feb. 27, 1985 [JP] Japan .................. 60-38248

[51] Int. Cl.$^4$ .................. G06F 7/34; G06F 15/35
[52] U.S. Cl. .................................. 364/726
[58] Field of Search ......................... 364/726

[56] References Cited

U.S. PATENT DOCUMENTS

| | | | |
|---|---|---|---|
| 3,617,720 | 11/1971 | Gentleman | 364/726 |
| 3,637,399 | 6/1972 | Hanke et al. | 364/726 |
| 4,075,630 | 2/1978 | Shapiro et al. | 364/726 |
| 4,211,926 | 7/1980 | Nakaya et al. | 250/455 T |
| 4,266,279 | 5/1981 | Hines | 364/726 |
| 4,501,149 | 2/1985 | Konno et al. | 364/726 |
| 4,615,027 | 9/1986 | Rajkai | 364/726 |
| 4,689,762 | 8/1987 | Thibodeau, Jr. | 364/726 |

FOREIGN PATENT DOCUMENTS 51-62635 5/1976 Japan .
56-31741 3/1987 Japan .

OTHER PUBLICATIONS

Stearns, Samuel D., *Digital Signal Analysis*, Hayden Book Co., Inc., Rochelle Park, NJ, 1975, pp. 50-77.

Primary Examiner—Gary V. Harkcom
Assistant Examiner—Dale M. Shaw
Attorney, Agent, or Firm—Moonray Kojima

[57] ABSTRACT

An apparatus for Fourier Transform which achieves a spatial frequency multiplication without involving an increase in the operation time. The apparatus has a memory (MM) for storing data obtained by sampling. The Fourier transform of the data stored in this memory is undertaken by circuitry that performs Fourier transform functions (ADD, MUL, HM1, HM2, TBM) without adding 0's to the data, and is simultaneously written to a plurality of memories (M1, M2, M3, M4) at corresponding relative addresses. A series of addresses is specified through these memories (M1-M4).

4 Claims, 4 Drawing Sheets

FIG. 3

| Index | Value |
|---|---|
| 0 | a0 |
| 1 | 0 |
| 2 | 0 |
| 3 | 0 |
| 4 | a1 |
| 5 | 0 |
| 6 | 0 |
| 7 | 0 |
| 8 | a2 |
| 9 | 0 |
| 10 | 0 |
| 11 | 0 |
| $4i$ | $a_i$ |
| $4i+1$ | 0 |
| $4i+2$ | 0 |
| $4i+3$ | 0 |
| $N'-4$ | $a_{N-1}$ |
| $N'-3$ | 0 |
| $N'-2$ | 0 |
| $N'-1$ | 0 |

$N' = 4N$

APPARATUS FOR FOURIER TRANSFORM

DESCRIPTION

1. Technical Field

In image engineering, such as computerized axial tomography (CAT or CT), it is necessary to reconstruct images with high spatial resolution in order to clearly image small objects. The present invention relates to an apparatus for increasing the spatial frequency components (so-called spatial frequency multiplication) needed for such a high-resolution imaging, by making use of Fourier transform.

2. Background Art

When an image is reconstructed with high resolution by computerized axial tomography, a convolution is performed using Fourier transform. During this process, a desired number of O's are inserted into an array of data obtained by sampling. Then, the Fourier transform of the increased amount of data is taken to increase the spatial frequency components. For example, a signal is sampled, resulting in N values $a_0, a_1, a_2, \ldots, a_{N-1}$, as shown in FIG. 2. Then, two O's are added to each value, increasing the number of values to 3N. Subsequently, N O's are added to this array of values to obtain 4N values. Then, the Fourier transform of the 4N values is taken to multiply the Nyquist rate by a factor of three.

Let us assume that N=1024. Then, it is necessary to add 1024 O's to 3N (=3072) values. Then, real numbers which are N' (=4096) in total must be subjected to Fourier transform. It takes a very long time to perform this mathematical operation. Now let T be the time required to take the Fourier transform of 1024 real numbers. If the number of data items is increased by a factor of 4, and if the number of loops processed increases by a factor of 1.2, then the operation time required for the mathematical operation will increase by a factor of about 5, because $4 \times 1.2$ T=4.8 T. In reality, the Fourier transform of 2048 complex numbers is taken to reduce the operation time, but it is not yet sufficiently short.

When a spatial frequency is multiplied by a factor of four, 3 O's are added to each of N values $a_0, a_1, a_2, \ldots, a_{N-1}$ derived by sampling, s shown in FIG. 3. Then, the Fourier transform of the resulting 4N values is taken. Therefore, the time required for the transformation is the same as in the case where the spatial frequency is multiplied by a factor of three.

DISCLOSURE OF THE INVENTION

It is an object of the present invention to provide an apparatus capable of multiplying spatial frequencies by means of Fourier transform without involving an increase in the operation time.

In accordance with the invention, data obtained by sampling is stored in a memory (MM). The Fourier transform of the data is taken by Fourier transform means (ADD, MUL, HM1, HM2, TBM) without introducing O's to the data. The result is written simultaneously to a plurality of memories (M1, M2, M3, M4) at relative addresses corresponding to each other. A series of addresses is specified through these memories (M1-M4).

Brief Description of the Drawings

FIGS. 2 and 3 show arrays of data processed during the conventional process of Fourier transform.

BEST MODE FOR CARRYING OUT THE INVENTION

The theory of the Fourier transform operation performed by an apparatus according to the invention is first described. N data items are obtained by sampling. We now take an example in which the maximum spatial frequency is increased by a factor of m by Fourier transform. For simplicity, it is assumed that $N=2^\gamma$ and $m=2^\alpha$, where $\gamma$ and $\alpha$ are integers. The N data items or values are written as $a_0, a_1, a_2, \ldots, a_{N-1}$ Referring to FIG. 3, O's are added to $N'=m \cdot N=2^{\gamma+\alpha}$. This includes values $b_0, b_1, b_2, \ldots, b_{N'-1}$. The following relations hold regarding these values:

$$b_{mi}=a_i (i=0, 1, 2, \ldots, N-1)$$

$$b_{mi+h}=0 \ (h=1, 2, \ldots, m-1)$$

The Fourier transform of the data is given by $$A(k) = \sum_{n=0}^{N'-1} b_n \cdot W^{nk} = \sum_{i=0}^{N-1} a_i \cdot W^{mik} \tag{1}$$

where $$W=e^{-j2\pi/N'}$$

$$k=0, 1, 2, \ldots, N'-1$$

Then, we have $$W^m = e^{-j2\pi m/N'} = e^{-j2\pi/N} \equiv W_N$$

Therefore, $$A(k) = \sum_{i=0}^{N-1} a_i \cdot e^{-j2\pi ik/N} = \sum_{i=0}^{N-1} a_i W_N^{ik} \tag{2}$$

$$(k = 0, 1, 2, \ldots, N'-1)$$

Meanwhile $$W_N^{i(k+hN)} = W_N^{ik} \cdot W_N^{ihN} = W_N^{ik} \cdot e^{-j2\pi ih} = W_N^{ik}$$

Consequently $$A(k)=A(k'+hN)+A(k') \tag{3}$$

where $$k'=0, 1, 2, \ldots, N-1$$

$$h=0, 1, 2, \ldots, m-1$$

Formula (3) above shows that the array of N' data items derived by Fourier transform contains recurrent Fourier transform of N data items $a_0, a_1, a_2, \ldots, a_{N-1}$. Therefore, the Fourier transform A (K) (k=0, 1, 2, ..., N-1) of N data items $a_0, a_1, a_2, \ldots, a_{N-1}$ is taken. The result is repeatedly utilized in accordance with formula (3) on the condition that $N \leq k \leq N'-1$. The result is the same as the Fourier transform of N' ' data items $b_0, b_1, b_2, \ldots, b_{N'-1}$. That is, it is only necessary to take the Fourier transform of N data items, rather than m N data items.

The apparatus according to the invention operates on the principle described above.

Figure 1:
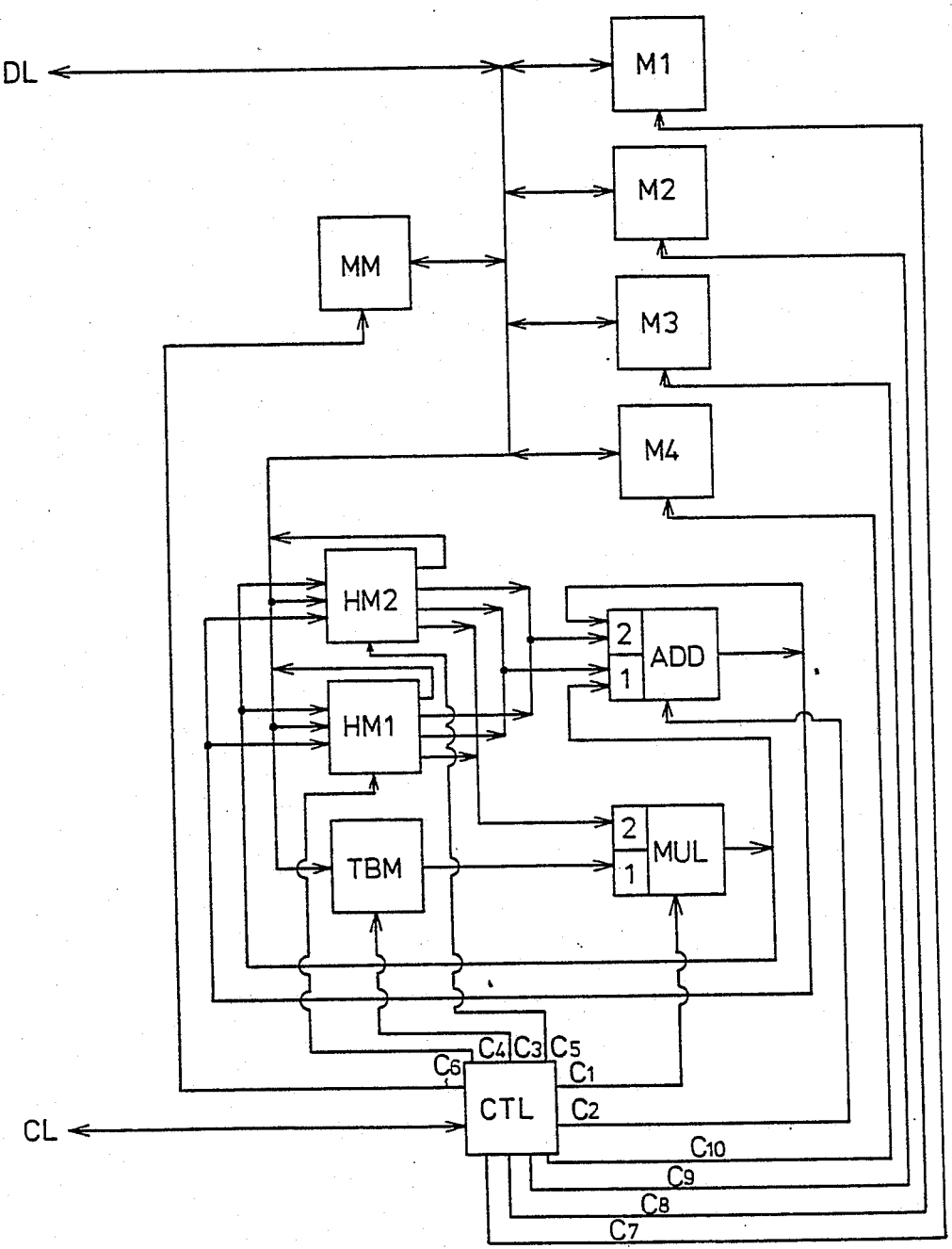
FIGS. 1 is a block diagram of an apparatus according to the invention.
Figure 2:
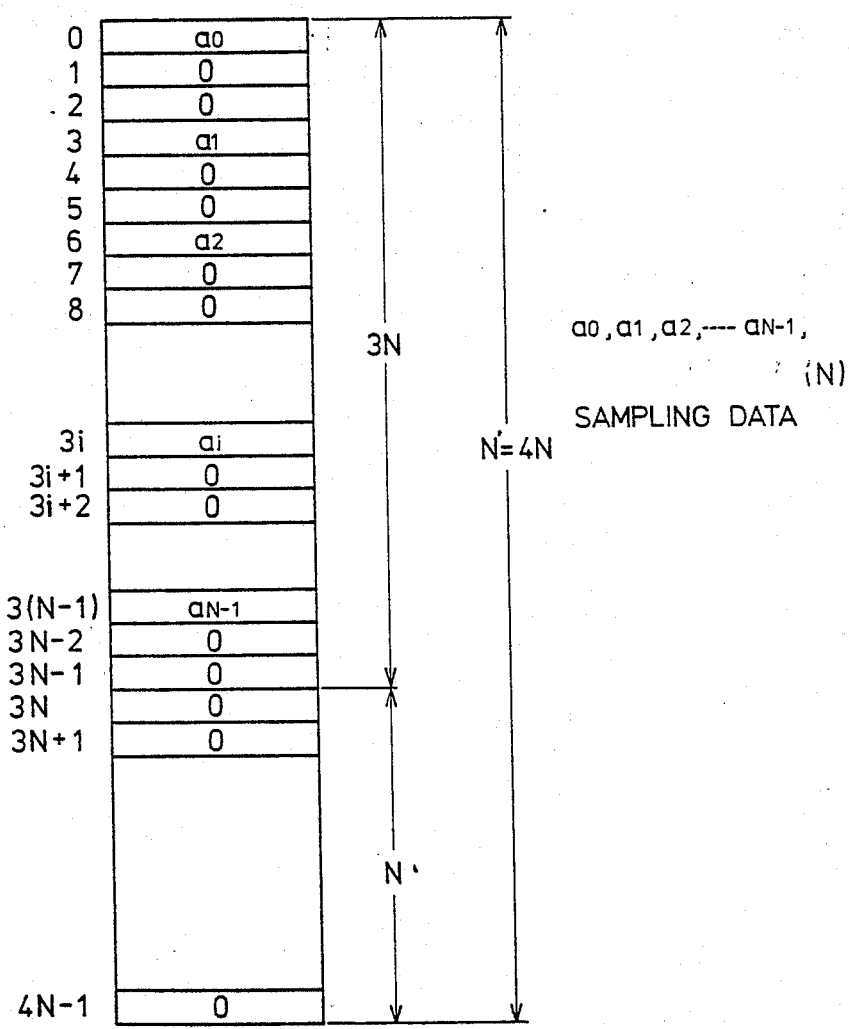
Figure 4:
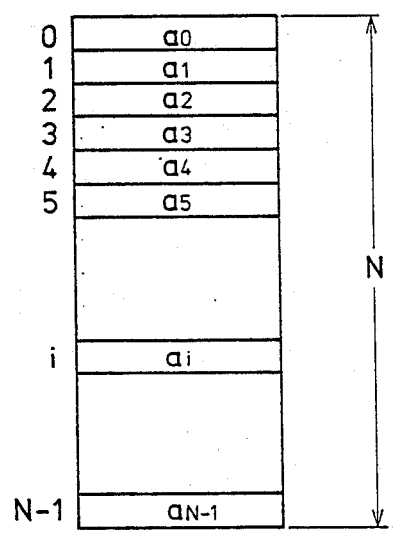
FIG. 4 shows an array of data used by the apparatus shown in FIG. 1.

Referring to FIG. 1, there is shown an apparatus according to the invention. This apparatus multiplies the spatial frequency by a factor of four, i.e., m=4. The apparatus includes a memory MM in which input data (N data items in real numbers, N/2 data items in imaginary numbers) or data derived in the course of a Fourier transform operation is stored, or data is read from the memory. Data held in memories HM1 and HM2, such as registers, can be accessed rapidly. The data read from the memory MM is held in the memories HM1 and HM2. An adder ADD and a multiplier MUL are used to perform arithmetic operations by fast Fourier transform (FFT). Also, the memories HM1 and HM2 are used as buffer registers for storing intermediate results or the final results of these arithmetic operations. Data can be written to, or read from, the memories HM1 and HM2 with the minimum cycle time of this system. Addresses at which data is written to, or read from, the memories HM1 and HM2 can be modified in parallel with the writing or reading of data. A table memory TBM stores the constants which are read out and used to calculate W (M) by a fast Fourier transform operation or to unpack a format including constants of sine and cosine terms.

The pipeline adder ADD can continuously perform additive or subtractive operations on two inputs 1 and 2 with the minimum cycle time of this system. The pipeline multiplier MUL can continuously perform multiplicational operations on two inputs 1 and 2 with the minimum cycle time of the system.

The result of a fast Fourier transform operation which is read from the memory MM, HM1, or HM2 is written to memories M1, M2, M3, and M4. A series of addresses is specified through the memories M1–M4, but data can be written to each of these memories, independently of the others. It is also possible that one of the memories M1–M4 acts also as the memory MM. A control device CTL controls various arithmetic operations, various access operations to memories, and parallel operations of various devices for performing a fast Fourier transform operation, unpacking, multiplication of frequency, etc.

An external data line DL is used to transfer data to an external device. The memories MM, M1–M4, HM1, HM2, TBM are connected with the external data line DL via internal data lines. Each of the high-speed access memories HM1 and HM2 receives the output signals from the adder ADD and the multiplier MUL. A first output of each of the high-speed access memories HM1 and HM2 is connected with an internal data line. A second output is connected with input 2 of the adder ADD. A third output is connected with input 1 of the adder ADD. A fourth output is tied with input 2 of the multiplier MUL. The output of the adder ADD is connected with its own input 2. The output of the multiplier MUL is connected with input 1 of the adder ADD. The output of the table memory TBM is connected with input 1 of the multiplier MUL.

An external control line CL is connected with the control apparatus CTL, and is used to control transmission of data to or from an external device. Control signals are supplied from the control apparatus CTL via control lines C1–C10. The high-speed arithmetic device comprising the adder ADD, the multiplier MUL, the high-speed access memories HM1 and HM2, and the table memory TBM for performing a Fourier transform operation is not limited to the configuration shown in FIG. 1, but rather any other high-speed arithmetic device or unit may be employed as long as it can perform a fast Fourier transform operation.

Tee apparatus constructed as described above takes the Fourier transform of the data stored in the memory MM under the control of the control device CTL in accordance with the theory described above. The data stored in the memory MM was obtained by sampling a signal and then supplied to the memory via the external data line DL.

One example of alogorithm used for Fourier transform is now described, but various other algorithms can be employed for that purpose. There exist N data items $a_0, a_1, a_2, a_3, \ldots, a_{N-2}, a_{N-1}$. If these values are real numbers, they are compressed into N/2 imaginary values $d_0 = a_0 + ja_1, d_1 = a_2 + ja_3, \ldots, d_{N/2-1} = a_{N-2} + ja_{N-1}$. Then, these data items are subjected to a fast Fourier transform operation. We now take an example of fast Fourier transform in which the base is 2, the number of real values is N, and the in-place and the DIT methods are used. In this case, the algorithm is carried out as follows.

(a) It is assumed that the following relations hold:

$$N/2 = 2^{\gamma-1}, \quad ND = N/4, \quad h = 1$$

(b) Let K and M be equal to null (K=0, M=0).

(c) The following arithmetic operations are performed on $k = K, K+1, K+2, \ldots, K+N\,D-1$.

$$C_h(k) = C_{h-1}(k) + C_{h-1}(k+ND) \cdot W(M) \tag{4-1}$$

$$C_h(k+ND) = C_{h-1}(k) - C_{h-1}(k+ND) \cdot W(M) \tag{4-2}$$

where $W(M) = \cos\{2\pi p/(N/2)\} + j \cdot \sin\{2\pi p/(N/2)\}$ $p = \text{Bit Reverse}\{M\}, j^2 = -1$ $$C_0(k) \equiv C_k = a_{2k} + j \cdot a_{2k+1} \tag{4-3}$$

(d) Assuming that M=M+2 and K=K+2 ND, if K<N/2, then the process is returned to (c).

(e) Assuming that ND=ND/2 and h=h+1, if $h \leq \gamma - 1$, then the process is returned to (b).

(f) With respect to $k = 0, 1, \ldots, N/2-1$, the array of output data is normalized as follows.

If $q(= \text{Bit Reverse}\{k\}) > k$, then $$G = C_{\gamma-1}(q)$$

$$C_{\gamma-1}(q) = C_{\gamma-1}(k) \tag{4-4}$$

$$C_{\gamma-1}(k) = G$$

In order to obtain the actual result based on the result of the compressed Fourier transform, the following operations for unpacking the format are performed. Note that $$C_{\gamma-1}(k) \equiv C(k) = C_R(k) + j \cdot C_I(k)$$

$$A_R(k) = \tfrac{1}{2}\{C_R(k) + C_R(N/2 - k)\} + \tfrac{1}{2}\{C_I(k) + C_I(N/2 - k)\} \cdot \cos(2\pi k/N) - \tfrac{1}{2}\{C_R(k) - C_R(N/2 - k)\} \cdot \sin(2\pi k/N) \tag{5-1}$$

$$A_I(k) = \tfrac{1}{2}\{C_I(k) - C_I(N/2 - k)\} - \tag{5-2}$$

-continued $$\tfrac{1}{2}\{C_I(k) + C_I(N/2 - k)\} \cdot \sin(2\pi k/N) -$$

$$\tfrac{1}{2}\{C_R(k) - C_R(N/2 - k)\} \cdot \cos(2\pi k/N)$$

$$A(k) = A_R(k) + j \cdot A_I(k) \tag{5-3}$$

The result of the fast Fourier transform operation performed in this way is written simultaneously to the memories M1–M4 at identical relative addresses under the control of the control apparatus CTL. Therefore, when the writing of the N data items to the memories is finished, the same data regarding the result of the operation is stored in the memories M114 M4. A series of addresses is specified throughout these memories M1–M4. Therefore, it follows that data regarding the Fourier transform based on formula (3) above is stored in the memories M1–M4. Fourier transform $A(k)$ ($k=0$, 1, 2, ..., N-1) appears repeatedly 4 times in the data, and a frequency multiplication is achieved. That is, data concerning the obtained Fourier transform in the range from $k=0$ to $k=N-1$ is stored in the memory M1. Data about the data in the range from $k=N$ to $k=2N-1$, data in the range from $k=2N$ to $k=3N-1$, data in the range from $k=3N$ to $k=4N-1$ are stored in the memories M2, M3, M4, respectively. In this way, the same result as the Fourier transform of 4N data items including O's is obtained in the same period of time as required to take the Fourier transform of N data items. Therefore, the time required for the transformation is reduced by a factor of about five, compared with the case in which the Fourier transform of 4N data items including O's is taken.

The apparatus shown in FIG. 1 makes use of four memories M1–M4 to which the result of a Fourier transform operation is written, whereby the spatial frequency is multiplied by a factor of four. It is also possible to arbitrarily set the multiplication factor of the spatial frequency by setting the number of such memories to $2^\alpha$, where $\alpha$ is any desired natural number. The time required for the Fourier transform operation is constant irrespective of the multiplication factor of the frequency. Consequently, the effects of time reduction become more conspicuous as the multiplication factor is increased.

While the best mode for carrying out the invention has been described, it is to be understood that various changes and modifications will be apparent to those skilled in the art without departing from the inventive concepts which are delineated by the appended claims.

I claim:

1. An apparatus for Fourier transform comprising
    a first memory (MM) for storing data which is obtained by sampling and is to be subjected to Fourier transform; and
    means for multiplying spatial frequencies by fast Fourier transform without increasing operational time by eliminating the insertion of zeros otherwise needed for increased spatial frequencies, said means for multiplying comprising
    a plurality of second memories (M1, M2, M3, M4), each comprising a series of addresses, and arranged to permit data to be written into any one of the plurality of second memories independently of each other,
    Fourier transform means (ADD, MUL, HM1, HM2, TBM) for computing discrete Fourier transform from the data stored in said first memory by fast Fourier transform, and
    control means (CTL) for causing data delivered from said Fourier transform means to be written simultaneously into said plurality of second memories at identical relative addresses therein.

2. The apparatus of claim 1, wherein said fast Fourier transform is performed by an equation $$A(k) = A_R(k) + j \cdot A_I(k)$$

and wherein data obtained from the Fourier transform in the range of $k=0$ to $k=N-1$ is stored in a first of said second memories, and data in the range of $k=N$ to $k=2N-1$ is stored in a second of said second memories and data in the range of $k=mN$ to $k=(m+1)N-1$ is stored in the $(m+1)$th of the second memories, wherein both m and N are integers.

3. An apparatus for Fourier transform, comprising
    a plurality of memories, each comprising a series of addresses, and arranged to permit data to be written into any on of said plurality of memories independently of the others, with one of said plurality of memories being used for storing data which is obtained by sampling and is to be subjected to Fourier transform;
    means for multiplying spatial frequencies by fast Fourier transform without increasing operational time by eliminating the insertion of zeros otherwise needed for increased spatial frequencies, said means for multiplying comprising
    others than said one of said plurality of memories,
    Fourier transform means for computing discrete Fourier transform from data stored in said one of said memories by fast Fourier transform, and
    control for causing data delivered from said Fourier transform means to be written simultaneously into said others of said plurality of memories at identical relative address therein.

4. The apparatus of claim 2, wherein said fast fourier transform is performed by an equation $$A(k) = A_R(k) + j \cdot A_I(k)$$

and wherein data obtained from the Fourier transform is in the range of $k=0$ to $k=N-1$ is stored in a first of said others of said plurality of memories, and data in the range of $k=N$ to $k=2N-1$ is stored in a second of said others of said plurality of memories, and data in the range of $k=mN$ to $k=(m+1)N-1$ is stored in the $(m+1)$th of memories, wherein both m and N are integers.

* * * * *